US012103232B2

United States Patent
Wu et al.

(10) Patent No.: US 12,103,232 B2
(45) Date of Patent: Oct. 1, 2024

(54) THREE-DIMENSIONAL PRINTING OF REINFORCED CONCRETE AND NOZZLE THEREFOR

(71) Applicant: The Curators of the University of Missouri, Columbia, MO (US)

(72) Inventors: Chenglin Wu, Rolla, MO (US); Genda Chen, Rolla, MO (US); Dimitri Feys, Rolla, MO (US); Guirong Yan, Rolla, MO (US); Bryce Tyler Tafolla, Gladstone, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 138 days.

(21) Appl. No.: 17/797,342

(22) PCT Filed: Mar. 25, 2021

(86) PCT No.: PCT/US2021/024146
§ 371 (c)(1),
(2) Date: Aug. 3, 2022

(87) PCT Pub. No.: WO2021/195375
PCT Pub. Date: Sep. 30, 2021

(65) Prior Publication Data
US 2023/0055418 A1    Feb. 23, 2023

Related U.S. Application Data

(60) Provisional application No. 62/994,543, filed on Mar. 25, 2020.

(51) Int. Cl.
*B29C 64/209*     (2017.01)
*B28B 3/26*        (2006.01)
(Continued)

(52) U.S. Cl.
CPC .......... *B29C 64/209* (2017.08); *B28B 3/2645* (2013.01); *B28B 23/02* (2013.01);
(Continued)

(58) Field of Classification Search
CPC .......................... B28B 3/2645; B28B 23/022
See application file for complete search history.

(56) References Cited

U.S. PATENT DOCUMENTS 1,146,477 A * 7/1915 Cole ...................... B29C 45/045
                                                              425/380
1,553,362 A * 9/1925 Calcutt .................. B29D 30/02
                                                              152/286
(Continued)

FOREIGN PATENT DOCUMENTS

| CN | 110480791 A | 11/2019 | |
| EP | 1217142 A2 * | 6/2002 | ........... B28B 3/2645 |
| FR | 2667330 A1 * | 4/1992 | ............. A63B 51/02 |

OTHER PUBLICATIONS

International Search Report and Written Opinion, International Application No. PCT/US2021/024146, Dated Jun. 29, 2021, 10 pages.

*Primary Examiner* — Timothy Kennedy
(74) *Attorney, Agent, or Firm* — Stinson LLP (57) ABSTRACT

A three-dimensional printing system for reinforced concrete and a nozzle therefore. The system employs an extruder for extruding unreinforced concrete and a concrete reinforcement feeder is for feeding one or more elongate reinforcement members. The nozzle has an outlet and is operatively connected to the extruder and the concrete reinforcement feeder to receive the unreinforced concrete from the extruder and to receive the one or more elongate reinforcement members from the concrete reinforcement feeder. The nozzle combines the unreinforced concrete from the extruder and the one or more elongate reinforcement mem- (Continued)

bers from the concrete reinforcement feeder into a reinforced concrete extrusion and imparts the reinforced concrete extrusion through the outlet.

10 Claims, 12 Drawing Sheets

(51) Int. Cl.
  *B28B 23/02* (2006.01)
  *B29C 64/106* (2017.01)
  *B33Y 10/00* (2015.01)
  *B33Y 30/00* (2015.01)
(52) U.S. Cl.
  CPC ............ *B29C 64/106* (2017.08); *B33Y 10/00* (2014.12); *B33Y 30/00* (2014.12)

(56) References Cited

U.S. PATENT DOCUMENTS

| | | | |
|---|---|---|---|
| 2,730,761 A * | 1/1956 | Castellan | B29C 48/153 |
| | | | 156/500 |
| 3,969,052 A * | 7/1976 | Tamborini | B29C 48/32 |
| | | | 264/209.1 |
| 4,113,820 A * | 9/1978 | Tamborini | B29C 48/09 |
| | | | 264/171.2 |
| 5,545,297 A * | 8/1996 | Andersen | B05B 1/34 |
| | | | 264/102 |
| 10,399,247 B1 | 9/2019 | Al Jassmi et al. | |
| 2010/0224309 A1* | 9/2010 | Tashiro | B29C 48/0022 |
| | | | 156/390 |
| 2017/0365365 A1 | 12/2017 | White et al. | |
| 2023/0061766 A1* | 3/2023 | Gouwy | C04B 41/4586 |
| 2023/0150168 A1* | 5/2023 | Gouwy | B28B 23/02 |
| | | | 428/457 |

* cited by examiner

THREE-DIMENSIONAL PRINTING OF REINFORCED CONCRETE AND NOZZLE THEREFOR

CROSS-REFERENCE TO RELATED APPLICATIONS

This application is a U.S. national stage application of International Application No. PCT/US2021/024146, filed Mar. 25, 2021, and claims priority to U.S. Provisional Patent Application No. 62/994,543, filed Mar. 25, 2020, and entitled THREE-DIMENSIONAL PRINTING OF REINFORCED CONCRETE AND NOZZLE THEREFOR, which are hereby incorporated by reference in their entirety.

FIELD OF THE INVENTION

This invention relates to 3D printing of reinforced concrete structures.

BACKGROUND

Three-dimensional printing of concrete structures has advantages over other construction methods in several aspects, not limited to speed, labor, labor costs, management, and scheduling. It also facilitates construction of structures of complex geometry and material composition. However, current approaches are limited by continued reliance on fixed-form reinforcement cages and fiber admixtures, which has hindered development of concrete printing, and especially the realization of truly free-form structures.

SUMMARY

In one aspect, a nozzle for three-dimensional (3D) printing of reinforced concrete comprises a first inlet configured for connection to a concrete extruder such that the concrete extruder can extrude unreinforced concrete through the first inlet. A second inlet is configured for connection to a concrete reinforcement feeder such that the concrete reinforcement feeder can feed one or more elongate reinforcement members into the nozzle through the second inlet. An outlet is in communication with the first inlet and the second inlet. The nozzle is configured to combine the unreinforced concrete extruded through the first inlet with the one or more elongate reinforcement members fed through the second inlet to form reinforced concrete in the nozzle and to impart an extrusion of the reinforced concrete through the outlet of the nozzle.

In another aspect, a three-dimensional printing system for reinforced concrete comprises an extruder for extruding unreinforced concrete. A concrete reinforcement feeder is for feeding one or more elongate reinforcement members. A nozzle has an outlet. The nozzle is operatively connected to the extruder and the concrete reinforcement feeder to receive the unreinforced concrete from the extruder and to receive the one or more elongate reinforcement members from the concrete reinforcement feeder. The nozzle is configured to combine the unreinforced concrete from the extruder and the one or more elongate reinforcement members from the concrete reinforcement feeder into a reinforced concrete extrusion and to impart the reinforced concrete extrusion through the outlet.

Other aspects and features will be apparent hereinafter.

DRAWINGS

Corresponding reference characters indicate corresponding parts throughout the drawings.

DETAILED DESCRIPTION OF PREFERRED EMBODIMENTS

In accordance with the present invention, free-form printing is facilitated by the fact that concrete reinforcement can be mechanically configured into desired patterns and shapes during printing. This allows architects and engineers to configure reinforcement without cage assembly or pre-installment, and to achieve large-span, slender, free-formed buildings and other structures. This approach also presents a wide platform for multifunctional reinforcement that is capable of sensing, protecting, as well as energy harvesting and storage in next-generation building envelopes. Such advantages are accomplished without shearing fresh concrete or reinforcement-concrete interfaces during printing.

Figure 1A:
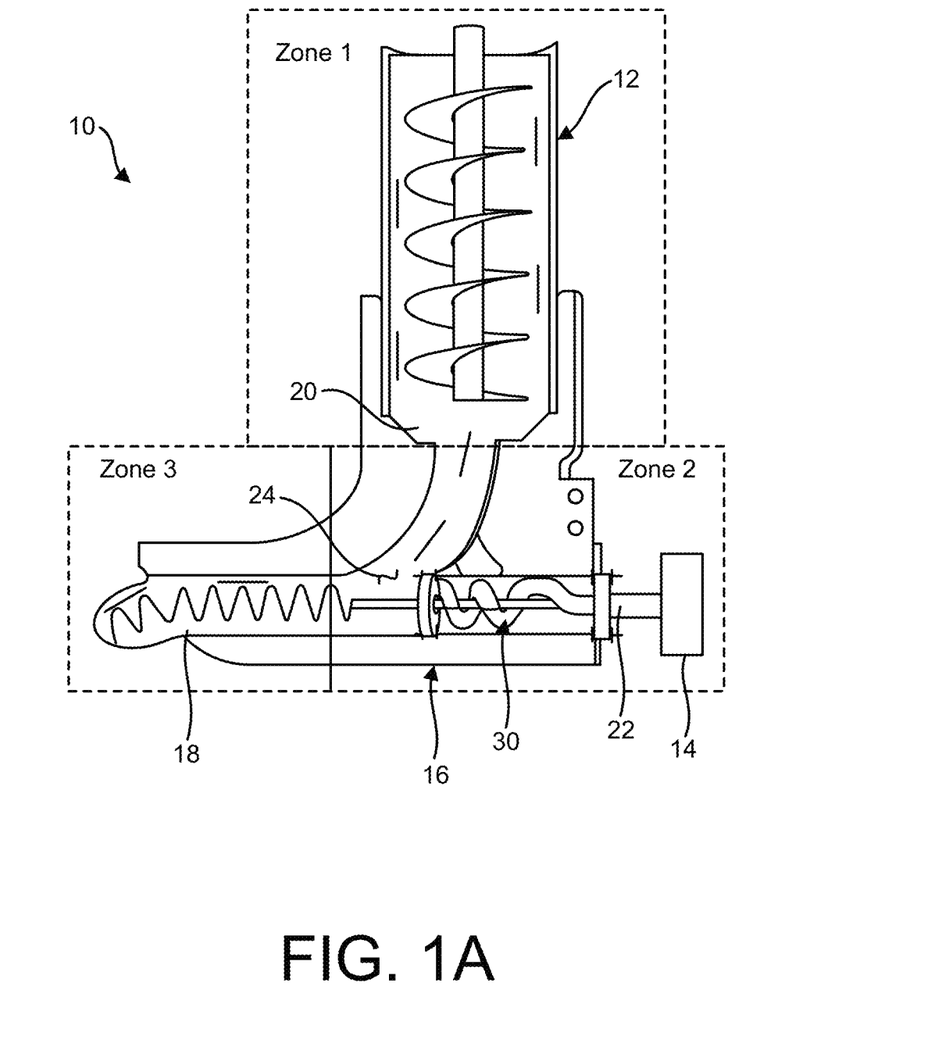
FIG. 1A is a schematic illustration of a 3D printing system.
Figure 1B:
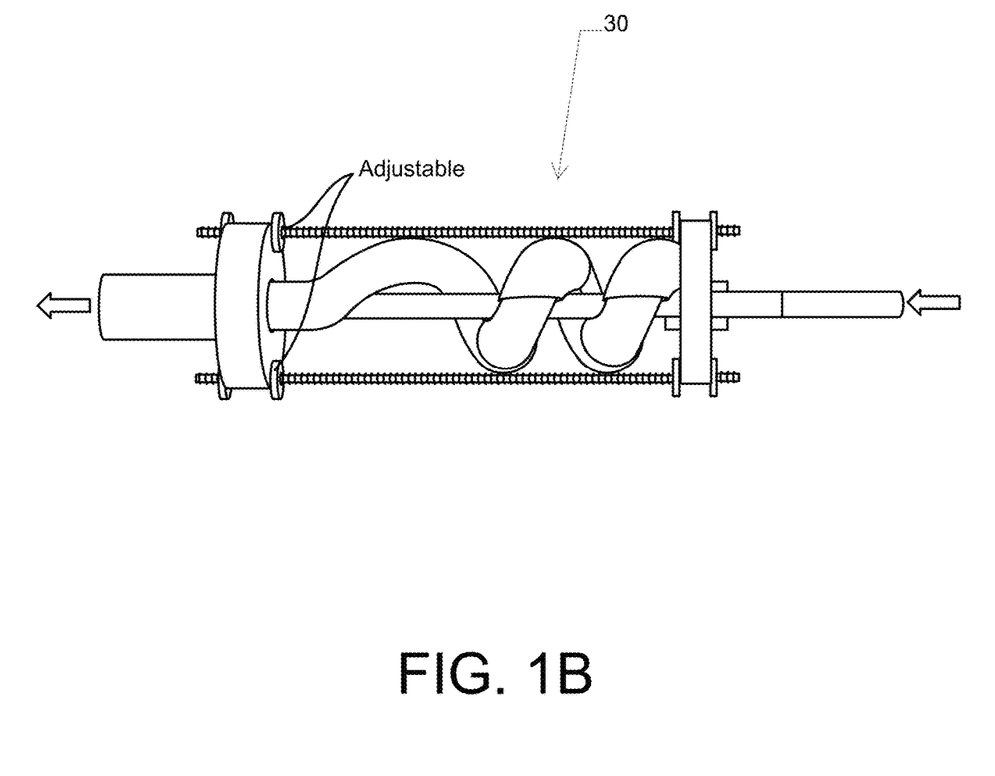
FIG. 1B is a perspective of a reinforcement configurator of the 3D printing system.
Figure 1C:
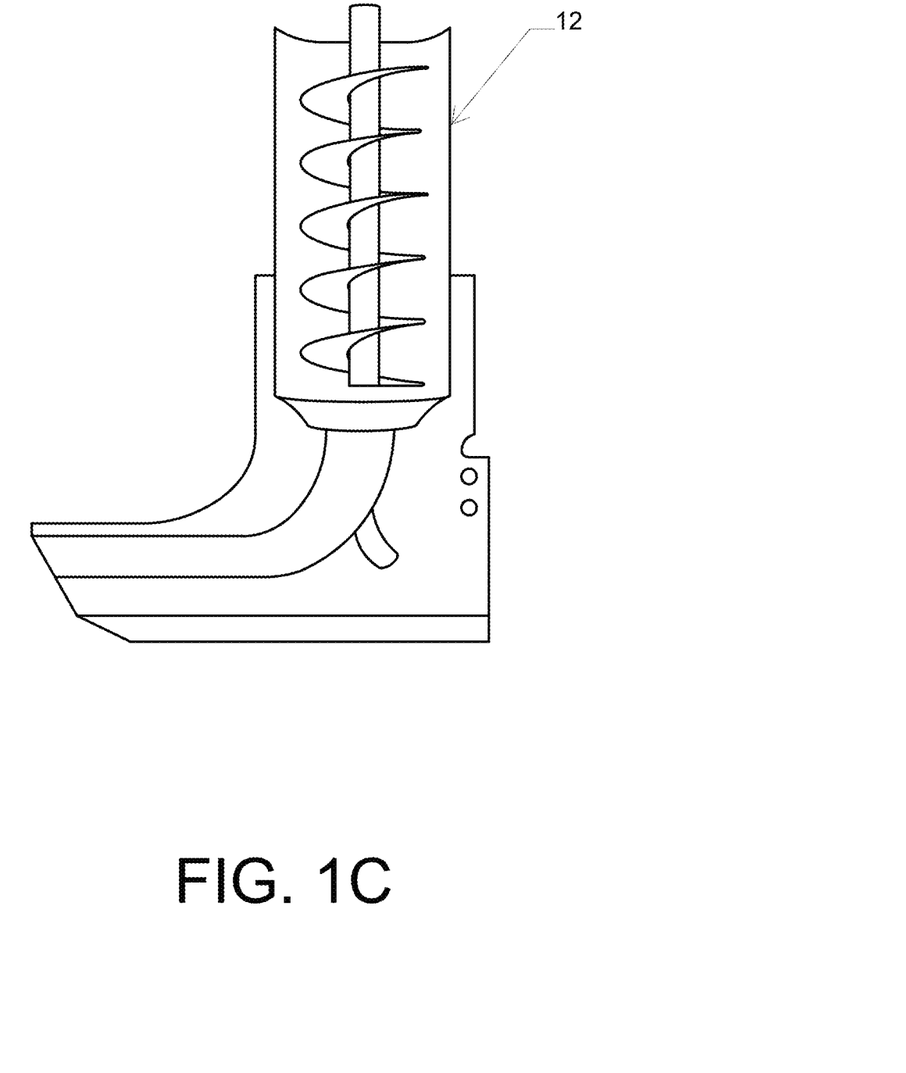
FIG. 1C is a schematic illustration of an extruder coupled to a nozzle of the 3D printing system.

Referring to FIGS. 1A-1C, the inventive 3D printing system 10 can employ an extruder 12 for extruding unreinforced concrete, a concrete reinforcement feeder 14 for feeding one or more elongate reinforcement members, and a synchronized printing controller (not shown) configured to synchronize the extruder and the concrete reinforcement feeder. As shown, an exemplary embodiment of an extruder 12 uses an auger to impart flowable concrete through an extrusion passage. Other types of extruders such as piston-based extruders are also possible within the scope of this disclosure. An exemplary embodiment of a reinforcement feeder 14 comprises one or more driven pinions that urge a reinforcement member comprising a deformable metal wire, cable, rod, or bar forward along its axis. Other mechanisms for driving suitable reinforcement members forward (e.g., screw mechanisms, pistons, etc.) are also possible within the scope of this disclosure.

Figure 3:
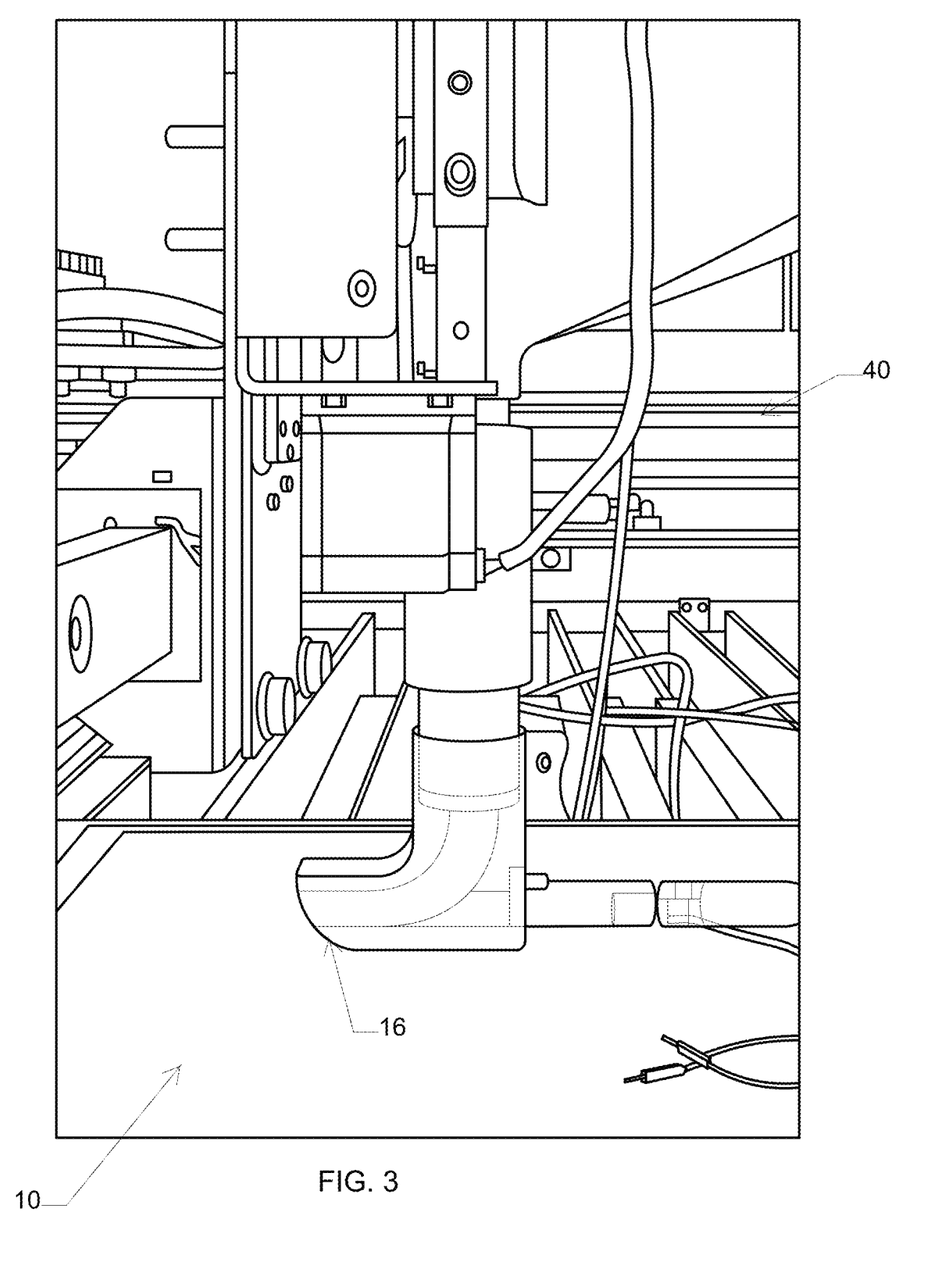
FIG. 3 is a perspective of the 3D printing system showing the nozzle on a mobile gantry.

As described in further detail below, the system 10 also employs a nozzle 16 configured to combine the unreinforced concrete from the extruder 12 and the one or more elongate reinforcement members from the concrete reinforcement feeder 14 into a reinforced concrete extrusion and to impart the reinforced concrete extrusion through an outlet 18 of the nozzle. Additionally, the system 10 can include an automated positioning system (e.g., a mobile gantry 40 (FIG. 3)) controlled by the synchronized printing controller to move a working head of the three-dimensional printing system including the nozzle 16 to lay successive layers of reinforced concrete extrusion to form a printed three-dimensional structure of reinforced concrete. The printing controller is configured to control the extruder 12 and reinforcement feeder 14 so that the concrete is placed at the same speed as a moving reinforcement that is being mechanically fed by the feeder. Simultaneously, the printing controller directs the automated positioning system to move the nozzle 16 along a predefined path to lay successive layers of reinforced concrete extrusion to form a three-dimensional structure of the desired shape. Certain embodiments employ the 3D printing nozzle 16 for installing reconfigurable internal reinforcement. The nozzle 16 has a first inlet 20 configured for connection to a concrete extruder 12 such that the concrete extruder can extrude unreinforced concrete through the first inlet. A second inlet 22 of the nozzle 16 is configured for connection to a concrete reinforcement feeder 14 such that the concrete reinforcement feeder can feed one or more elongate reinforcement members into the nozzle through the second inlet. The nozzle 16 also has an outlet 18 in communication with the first inlet and the second inlet. The nozzle 16 further comprises passage 24 connecting the first inlet 20 and the second inlet 22 to the outlet 18. The passage 24 includes a first portion opening through the first inlet 20, a second portion opening through the second inlet 22, and a third portion opening through the outlet 18. In the illustrated embodiment, the three portions of the passage 24 have a wye-shaped (Y) configuration. Each portion of the passage 24 has an axis, and the axes of the second, and third portions are coaxial, whereas the axis of the first portion of the passage is transverse to the other two portions. Generally, the nozzle 16 is configured to combine the unreinforced concrete extruded through the first inlet 20 with the one or more elongate reinforcement members fed through the second inlet 22 to form reinforced concrete in the nozzle passage 24 and to impart an extrusion of the reinforced concrete through the outlet 18.

A reinforcement configurator 30 is received in the second portion of the passage 24 and is operatively connected to the second inlet 22 such that each of the one or more elongate reinforcement members fed through the second inlet is fed through the reinforcement configurator. The reinforcement configurator 30 is generally configured to deform each elongate reinforcement member into a reinforcement shape as it is fed through the reinforcement configurator. In one or more embodiments, the reinforcement configurator 30 is configured to selectively adjust the reinforcement shape along the length of the extrusion of the reinforced concrete formed by the nozzle 16. In the illustrated embodiment, the reinforcement shape is a coil shape having a length and a pitch. As shown in FIG. 1B, in an exemplary embodiment, the configurator 30 comprises a coil-shaped tube through which the elongate reinforcing member is fed by the feeder 14 to form the elongate reinforcement member into a coil. The coil-shaped feed tube is expandable and retractable lengthwise to adjust the pitch of the coil. Other reinforcement configurators are also possible within the scope of this disclosure.

As explained above, the printing controller is configured to synchronize the rate of concrete extrusion with the rate at which the elongate reinforcement is fed into place. Thus, the extruder 12 can be controlled to have an extrusion speed that is compatible with the speed of the reinforcement configurator 30. When the concrete flow speed approaches the speed of the reinforcement being configured by the configurator 30, a well-bonded internally reinforced concrete member can be printed. In a first embodiment, the reinforcement materials are materials that are deformable or can be cold-formed. Such materials include metal wires and cables. In an alternative embodiment, a thermal fusion based reinforcement configurator is used to provide flexibility in terms of selection of reinforcing materials.

FIG. 1A is a cross-sectional view of the printer nozzle head of the invention with associated extruder and reinforcement configurator. Concrete extrusion occurs in zone 1. Reinforcement feeding and configuration occurs in zone 2. And combining and discharge of the concrete and reinforcement occurs in zone 3. Details of the extruder are illustrated in FIG. 1B. Details of the reinforcement configurator including its tubular structure to form reinforcement in a spiral geometry are illustrated at FIG. 1C.

Figure 2A:
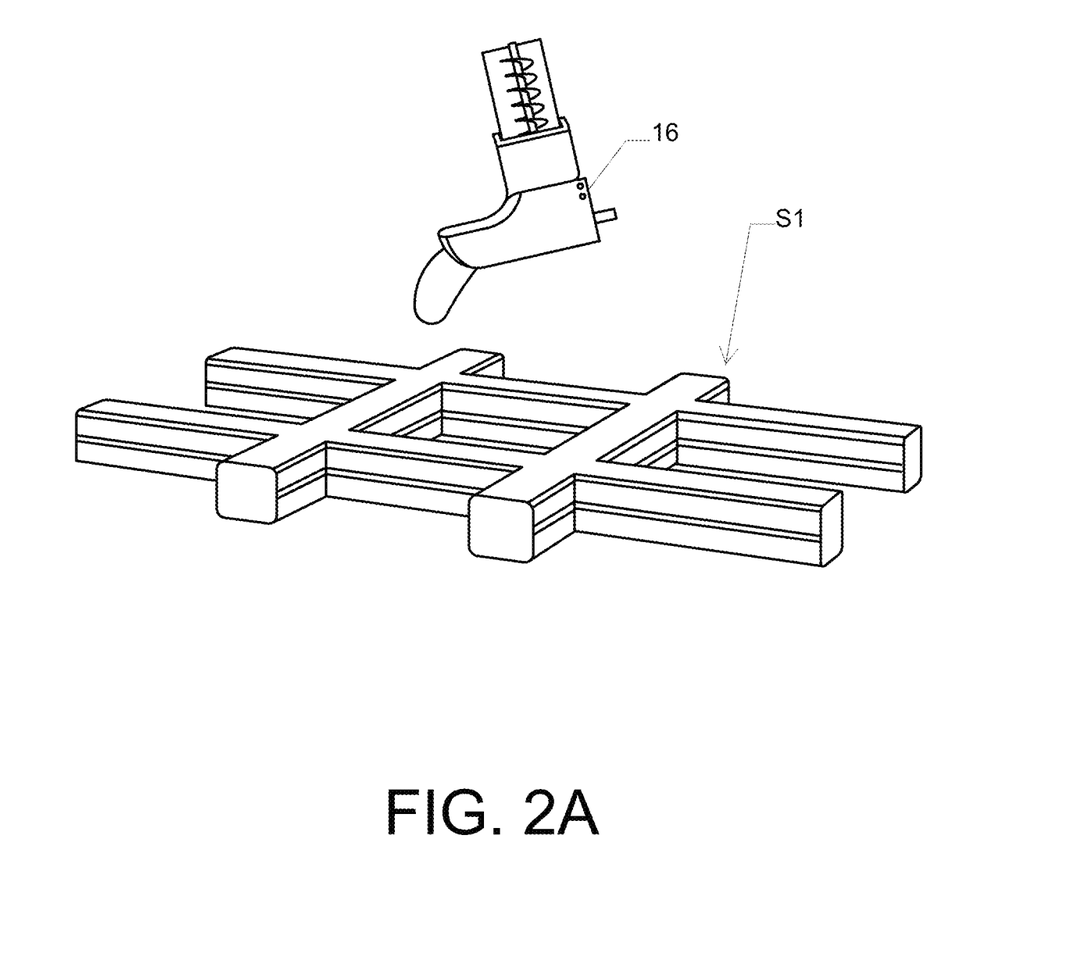
FIG. 2A is a perspective of the nozzle of the 3D printing system forming a multilayer structure of transverse beams.
Figures 2B, 2C, 2D:
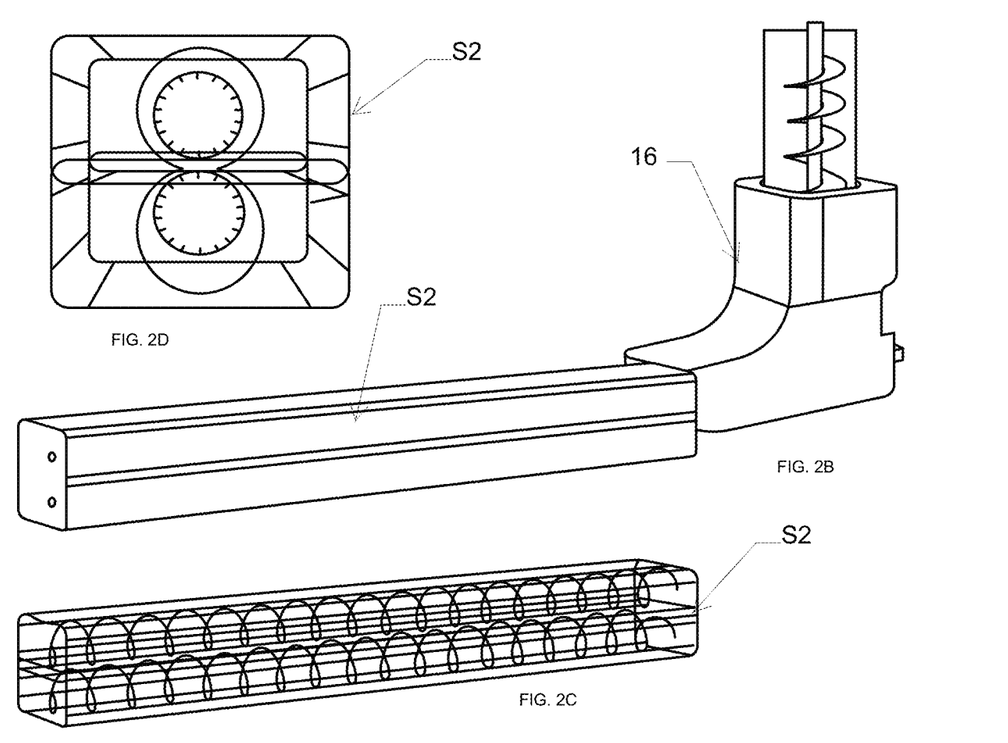
FIG. 2B is a perspective of the nozzle forming a multilayer reinforced concrete beam.
FIG. 2C is a perspective of the multilayer reinforced concrete beam with concrete thereof shown transparently to reveal how the reinforcement is positioned within the beam.
FIG. 2D is a cross section of the multilayer reinforced concrete beam.
Figure 2E:
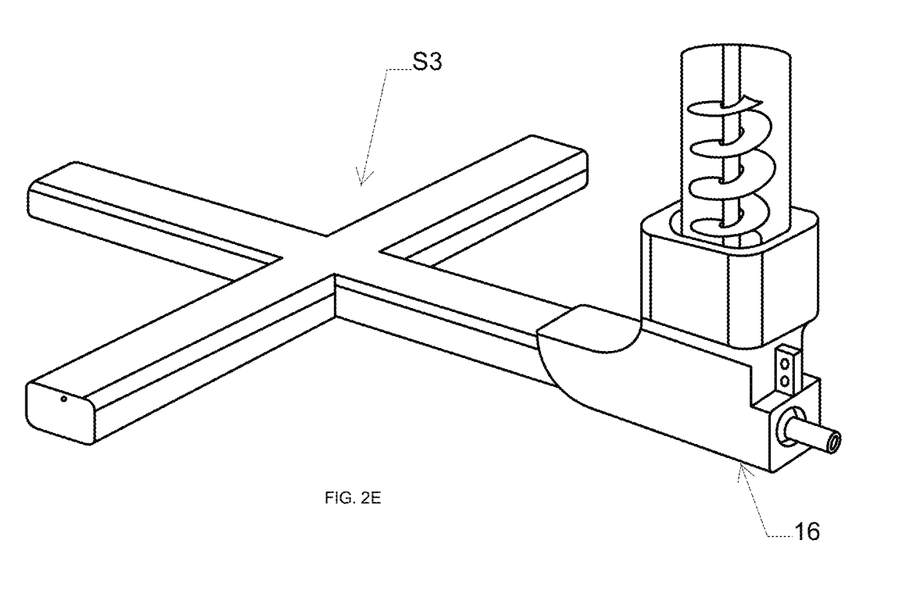
FIG. 2E is a perspective of the nozzle forming a reinforced concrete structure comprising intersecting concrete beams.
Figure 2F:
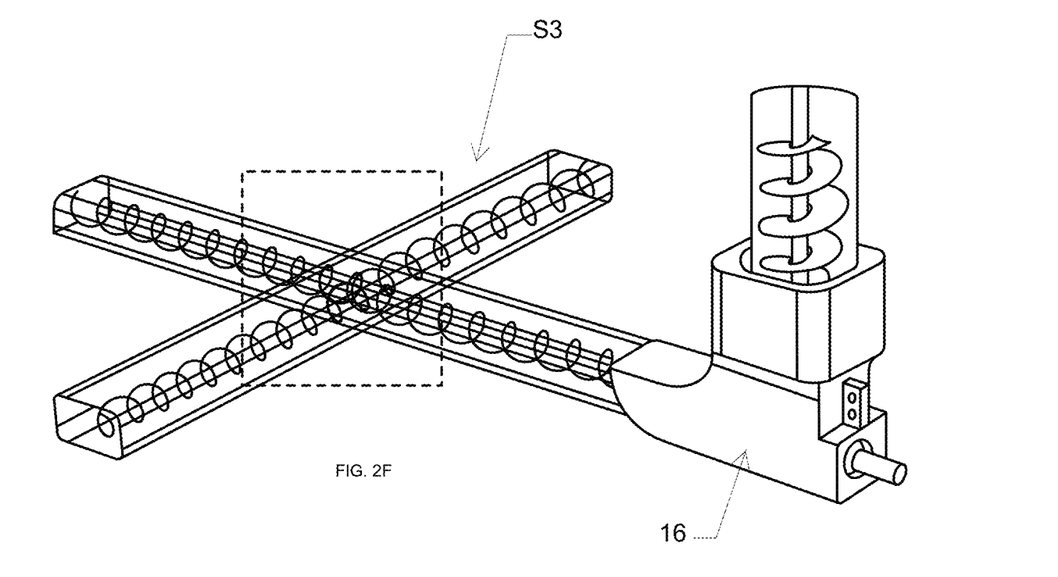
FIG. 2F is a perspective of the reinforced concrete structure of FIG. 2E, illustrating concrete thereof transparently to reveal how the reinforcement is positioned within the structure.
Figure 2G:
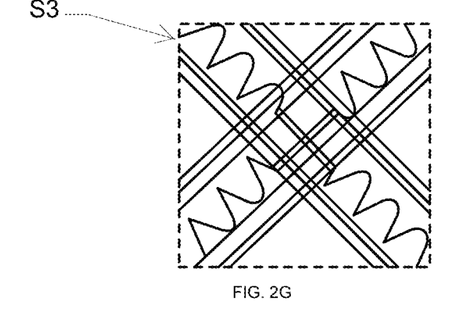
FIG. 2G is a plan view of a portion of the concrete structure of FIG. 2E, illustrating concrete thereof transparently to reveal how the reinforcement is positioned within the structure.
Figure 2H:
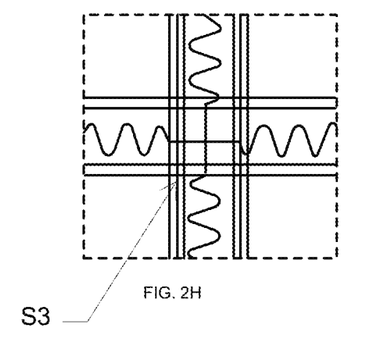
FIG. 2H is another plan view of a portion of the concrete structure of FIG. 2E, illustrating concrete thereof transparently to reveal how the reinforcement is positioned within the structure.

The printing controller can be configured to direct an automated positioning system to move the working head (e.g., the nozzle 16) of the three-dimensional printing system 10 to lay successive layers or beams of reinforced concrete extrusion to form a printed three-dimensional structure of reinforced concrete. Referring to FIG. 2A, in one or more embodiments, the printing system can be used to form a multilayer intersecting structure S1 of reinforced concrete. FIGS. 2B-2D illustrate one exemplary method of forming a multilayered beam structure S2 using the printing system 10. As shown in FIGS. 2C and 2D, in certain embodiments, the printing system 10 prints the structure S2 so that the reinforcement in successive layers interlocks or overlaps heightwise. As can be seen, the synchronized printing controller is configured to direct the three-dimensional printing system 10 to enmesh or interlock the reinforcement members in successive layers of the reinforced concrete extrusion. FIGS. 2E-2H illustrate an exemplary method of forming an intersecting beam structure S3 from reinforced concrete extrusion using the printing system 10. As shown, the printing system 10 may be configured to adjust the way it lays the reinforcement (e.g., the shape or coil pitch of the reinforcement) at the intersection or joint section between two transverse beams to allow for continuous reinforcement along the beams through the joint section. It can be seen in FIGS. 2F-2H that the synchronized printing controller is configured to direct the three-dimensional printing system 10 to form a plurality of transverse lengths of reinforced concrete extrusion that intersect one another at one or more joint sections thereof. The synchronized printing controller is configured to direct the three-dimensional printing system to adjust a shape of at least one elongate reinforcement member along the joint section such that the shape of said at least one elongate reinforcement member along the joint section differs from the shape of said at least one elongate reinforcement member along an adjacent longitudinal section of the respective length of reinforced concrete extrusion. For example, in the illustrated embodiment, the printing system 10 forms substantially straight lengths of reinforcement along the joint section of each of the first and second beams, whereas along the remainder of the beams, the printing system forms coiled reinforcement.

In a further development of the invention, it is used to construct elements with hollow reinforcement functioning as internal pipelines able to transport fluids for harvesting and dissipating thermal energies.

It is evident from the foregoing that the invention is able to create large span structures with complex and efficient reinforcement. The cost and labor of reinforcement cages and their installation are avoided. Reinforcement patterns and spacing can be efficiently engineered to reduce structure dimensions and material costs.

Figure 4:
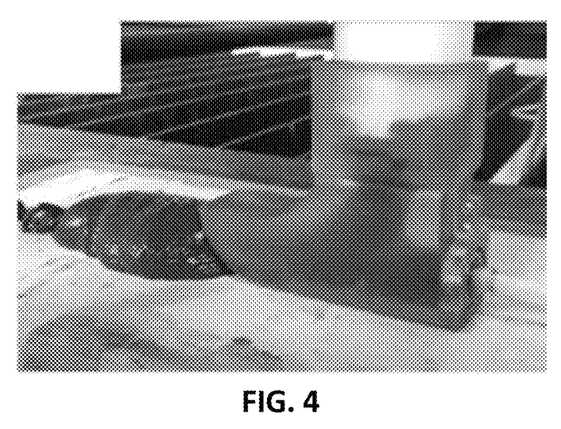
FIG. 4 is a photograph of a nozzle of a prototype 3D printing system as it is extruding a reinforced concrete beam.
Figure 5:
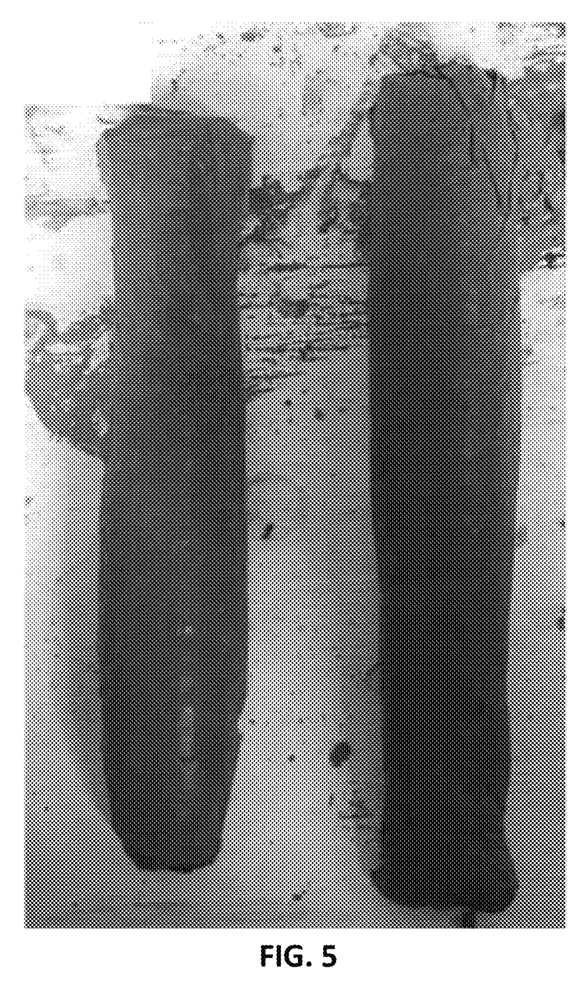
FIG. 5 is a photograph of two beams formed using the prototype printing system of FIG. 4, the photograph taken as a top plan view.
Figure 6:
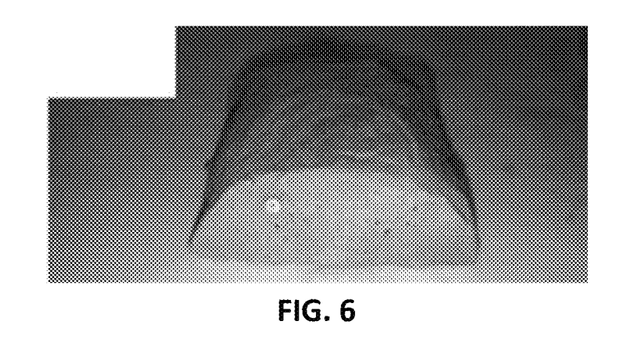
FIG. 6 is a photograph of one of the beams of FIG. 5, the photograph taken as a perspective from an end of the beam.
Figure 7:
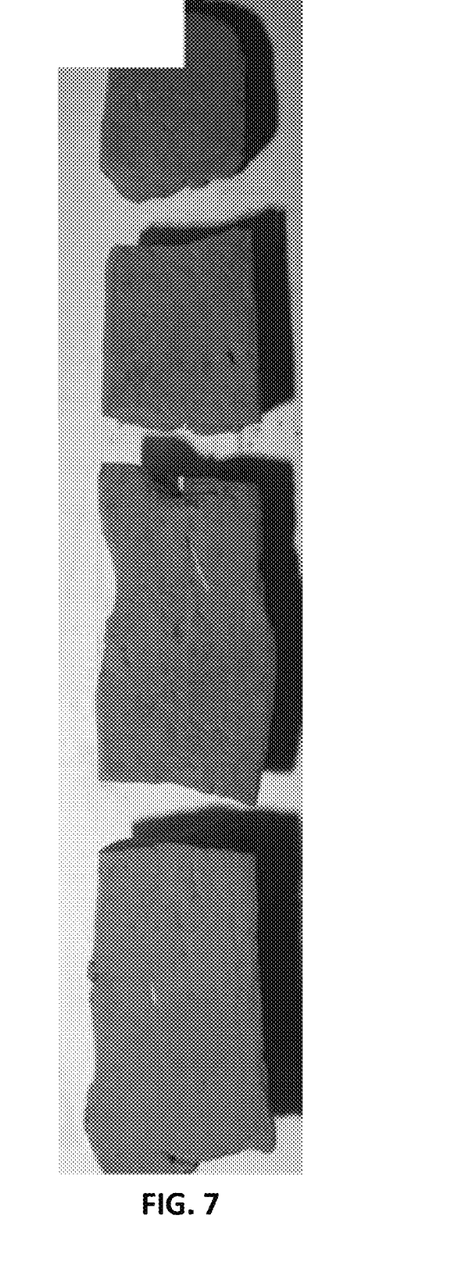
FIG. 7 is a photograph of one of the beams of FIG. 6 after being separated into sections, the photograph taken as a bottom plan view.

A prototype of the printing system 10 has been developed and tested. FIG. 4 is a photograph of the prototype nozzle 16 as it is being used to extrude wet concrete and simultaneously reinforce the concrete with a coiled elongate reinforcement member. FIG. 5 is a top elevation photograph of two single-layer reinforced concrete beams formed using the prototype nozzle 16 depicted in FIG. 4. FIG. 6 is a perspective taken from the end of one of the beams. The end of the elongate reinforcement is visible in this view. As can also be seen, the prototype system formed a beam of relatively uniform cross-sectional shape. The beam has a flat bottom conforming the surface on which it was formed and a convexly curved top. FIG. 7 is a photograph of the beam in a bottom plan view after having being cut into sections. As can be seen, the prototype system deployed in FIG. 4 demonstrates that the reinforced concrete 3D printing system 10 described above is capable of printing reinforced concrete structures as intended.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A nozzle for three-dimensional (3D) printing of reinforced concrete, the nozzle comprising:
 a first inlet configured for connection to a concrete extruder such that the concrete extruder can extrude unreinforced concrete through the first inlet;
 a second inlet configured for connection to a concrete reinforcement feeder such that the concrete reinforcement feeder can feed one or more elongate reinforcement members into the nozzle through the second inlet;
 a reinforcement configurator operatively connected to the second inlet such that each of the one or more elongate reinforcement members fed through the second inlet is fed through the reinforcement configurator, the reinforcement configurator configured to deform each elongate reinforcement member into a defined reinforcement shape as it is fed through the reinforcement configurator;
 an outlet in communication with the first inlet and the second inlet; and
 the nozzle being configured to combine the unreinforced concrete extruded through the first inlet with the one or more elongate reinforcement members fed through the second inlet to form reinforced concrete in the nozzle and to impart an extrusion of the reinforced concrete through the outlet of the nozzle.

2. The nozzle as set forth in claim 1, wherein the nozzle comprises a passage connecting the first inlet and the second inlet to the outlet, the passage including a first portion opening through the first inlet, a second portion opening through the second inlet, and a third portion opening through the outlet.

3. The nozzle as set forth in claim 2, wherein each of the first portion, the second portion, and the third portion has a respective axis, and the axes of the second portion and the third portion are coaxial.

4. The nozzle as set forth in claim 2, wherein the passage has a wye-shaped (Y) configuration.

5. The nozzle as set in claim 2, wherein the reinforcement configurator is received in the second portion of the passage.

6. The nozzle as set forth in claim 1, wherein the reinforcement configurator is configured to selectively adjust the reinforcement shape along the length of the extrusion of the reinforced concrete.

7. The nozzle as set forth in claim 1, wherein the reinforcement shape is a coil having a length and a pitch.

8. The nozzle as set forth in claim 7, wherein the reinforcement configurator is configured to adjust the pitch of the coil along the length of the coil.

9. A nozzle for three-dimensional (3D) printing of reinforced concrete, the nozzle comprising:
 a first inlet configured for connection to a concrete extruder such that the concrete extruder can extrude unreinforced concrete through the first inlet;
 a second inlet configured for connection to a concrete reinforcement feeder such that the concrete reinforcement feeder can feed one or more elongate reinforcement members into the nozzle through the second inlet;
 an outlet in communication with the first inlet and the second inlet;
 a passage connecting the first inlet and the second inlet to the outlet, the passage including a first portion opening through the first inlet, a second portion opening through the second inlet, and a third portion opening through the outlet; and
 a reinforcement configurator received in the second portion of the passage and operatively connected to the second inlet such that each of the one or more elongate reinforcement members fed through the second inlet is fed through the reinforcement configurator, and
 wherein the nozzle is configured to combine the unreinforced concrete extruded through the first inlet with the one or more elongate reinforcement members fed through the second inlet for forming reinforced concrete in the nozzle and imparting an extrusion of the reinforced concrete through the outlet of the nozzle,
 wherein the reinforcement configurator is configured to deform each elongate reinforcement member into a reinforcement shape as it is fed through the reinforcement configurator, and wherein the reinforcement configurator is configured to selectively adjust the reinforcement shape along the length of the extrusion of the reinforced concrete.

10. A nozzle for three-dimensional (3D) printing of reinforced concrete, the nozzle comprising:
  a first inlet configured for connection to a concrete extruder such that the concrete extruder can extrude unreinforced concrete through the first inlet;
  a second inlet configured for connection to a concrete reinforcement feeder such that the concrete reinforcement feeder can feed one or more elongate reinforcement members into the nozzle through the second inlet;
  an outlet in communication with the first inlet and the second inlet;
  a passage connecting the first inlet and the second inlet to the outlet, the passage including a first portion opening through the first inlet, a second portion opening through the second inlet, and a third portion opening through the outlet; and
  a reinforcement configurator received in the second portion of the passage and operatively connected to the second inlet such that each of the one or more elongate reinforcement members fed through the second inlet is fed through the reinforcement configurator, and
  wherein the nozzle is configured to combine the unreinforced concrete extruded through the first inlet with the one or more elongate reinforcement members fed through the second inlet for forming reinforced concrete in the nozzle and imparting an extrusion of the reinforced concrete through the outlet of the nozzle,
  wherein the reinforcement configurator is configured to deform each elongate reinforcement member into a reinforcement shape as it is fed through the reinforcement configurator,
  wherein the reinforcement shape is a coil having a length and a pitch, and
  wherein the reinforcement configurator is configured to adjust the pitch of the coil along the length of the coil.

* * * * *